(12) United States Patent
Ishikura

(10) Patent No.: US 9,369,453 B2
(45) Date of Patent: Jun. 14, 2016

(54) INFORMATION PROCESSING APPARATUS AND INFORMATION PROCESSING SYSTEM

(71) Applicant: Koji Ishikura, Kanagawa (JP)

(72) Inventor: Koji Ishikura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/330,091

(22) Filed: Jul. 14, 2014

(65) Prior Publication Data

US 2015/0033307 A1  Jan. 29, 2015

(30) Foreign Application Priority Data

Jul. 24, 2013  (JP) ................................. 2013-153152

(51) Int. Cl.
*H04L 29/06* (2006.01)

(52) U.S. Cl.
CPC ..................................... *H04L 63/08* (2013.01)

(58) Field of Classification Search
CPC ...................................................... H04L 63/08
USPC ............................................................ 726/7
See application file for complete search history.

(56) References Cited

U.S. PATENT DOCUMENTS

| | | | | |
|---|---|---|---|---|
| 6,256,644 B1* | 7/2001 | Shibayama | ....... | G06F 17/30952 |
| 7,036,626 B2* | 5/2006 | Niessen | ................. | B62D 6/008 |
| | | | | 180/443 |
| 7,039,629 B1* | 5/2006 | Theimer | ............. | G01C 21/3608 |
| RE42,861 E * | 10/2011 | Borza | ..................... | G06F 21/10 |
| | | | | 713/186 |
| 9,059,987 B1* | 6/2015 | Lofland | ............... | H04L 63/0815 |
| 2003/0220984 A1* | 11/2003 | Jones | ....................... | H04L 29/06 |
| | | | | 709/219 |
| 2003/0233537 A1* | 12/2003 | Wohlgemuth | ...... | H04L 63/0209 |
| | | | | 713/151 |
| 2003/0236879 A1* | 12/2003 | Moritani | ........... | G06F 17/30867 |
| | | | | 709/224 |
| 2004/0093466 A1* | 5/2004 | Hull | ........................ | H04L 67/18 |
| | | | | 711/133 |
| 2006/0256370 A1* | 11/2006 | Murakawa | .............. | G06F 21/31 |
| | | | | 358/1.15 |
| 2007/0185899 A1* | 8/2007 | Ziv et al. | ....................... | 707/102 |
| 2008/0104667 A1* | 5/2008 | Terada | .................... | H04L 63/08 |
| | | | | 726/2 |
| 2008/0250100 A1* | 10/2008 | Hatanaka et al. | ............. | 709/203 |
| 2009/0034521 A1* | 2/2009 | Kato | ....................... | G06F 21/31 |
| | | | | 370/389 |
| 2009/0055467 A1* | 2/2009 | Petersen | ............. | H04L 67/1095 |
| | | | | 709/203 |
| 2011/0004600 A1* | 1/2011 | Walker et al. | .................. | 707/748 |
| 2012/0099155 A1* | 4/2012 | Park et al. | ..................... | 358/1.16 |
| 2012/0154847 A1* | 6/2012 | Ono | ............................. | 358/1.14 |
| 2012/0157040 A1* | 6/2012 | Naito et al. | .................... | 455/406 |
| 2012/0259615 A1* | 10/2012 | Morin et al. | .......... | G06F 17/276 |
| | | | | 704/9 |

(Continued)

FOREIGN PATENT DOCUMENTS

| | | |
|---|---|---|
| JP | 2004-310357 | 11/2004 |
| JP | 2006-261802 | 9/2006 |
| JP | 2011-107959 | 6/2011 |

*Primary Examiner* — Hadi Armouche
*Assistant Examiner* — Shahriar Zarrineh
(74) *Attorney, Agent, or Firm* — Oblon, McClelland, Maier & Neustadt, L.L.P.

(57) ABSTRACT

An information processing apparatus includes a user authentication unit that authenticates a user, a data storage controller that controls the storing of data in a network storage and a local storage, a usage history information recording unit that records usage history information for all data stored in the network storage including user information who accessed the data, a prediction unit that predicts data that has a high probability of being accessed by the user based on identification information and the usage history information of the user authenticated by the user authentication unit, and an acquisition unit that acquires the data that has a high probability of being accessed predicted by the prediction unit from the network storage and stores the data in the local storage.

7 Claims, 13 Drawing Sheets

(56) References Cited

U.S. PATENT DOCUMENTS

| | | | |
|---|---|---|---|
| 2012/0310762 A1* | 12/2012 | Robbin et al. ............... 705/26.1 |
| 2013/0175165 A1* | 7/2013 | Okazaki .................... C25B 1/13 204/290.14 |
| 2013/0229482 A1* | 9/2013 | Vilcovsky .............. H04N 7/144 348/14.07 |
| 2013/0275165 A1* | 10/2013 | Udagawa ............... G06Q 50/14 705/5 |
| 2014/0075352 A1* | 3/2014 | Hansen ................. G06F 9/4451 715/765 |
| 2014/0156793 A1* | 6/2014 | Chan ................. G06F 17/30085 709/217 |
| 2014/0188956 A1* | 7/2014 | Subba ............... G06F 17/30221 707/829 |
| 2015/0089616 A1* | 3/2015 | Brezinski ........... G07C 9/00166 726/7 |

* cited by examiner

FIG. 4

| IMAGE ID | 000101 | | | | 000102 | | | | ... |
|---|---|---|---|---|---|---|---|---|---|
| STORAGE USER ID | 001 | | | | 003 | | | | ... |
| PRINT HISTORY | PRINTER USER ID | NUMBER OF PRINTING | | PRINTER USER ID | NUMBER OF PRINTING | | PRINTER USER ID | NUMBER OF PRINTING | |
| | | PREDETER-MINED PERIOD | TOTAL | | PREDETER-MINED PERIOD | TOTAL | | PREDETER-MINED PERIOD | TOTAL |
| | 001 | 2 | 5 | 001 | 1 | 2 | 001 | ... | ... |
| | 002 | 6 | 10 | 002 | 0 | 5 | 002 | ... | ... |
| | 003 | 0 | 3 | 003 | 4 | 5 | 003 | ... | ... |
| | 004 | 3 | 7 | 004 | 0 | 1 | 004 | ... | ... |
| | ... | ... | ... | ... | ... | ... | ... | ... | ... |

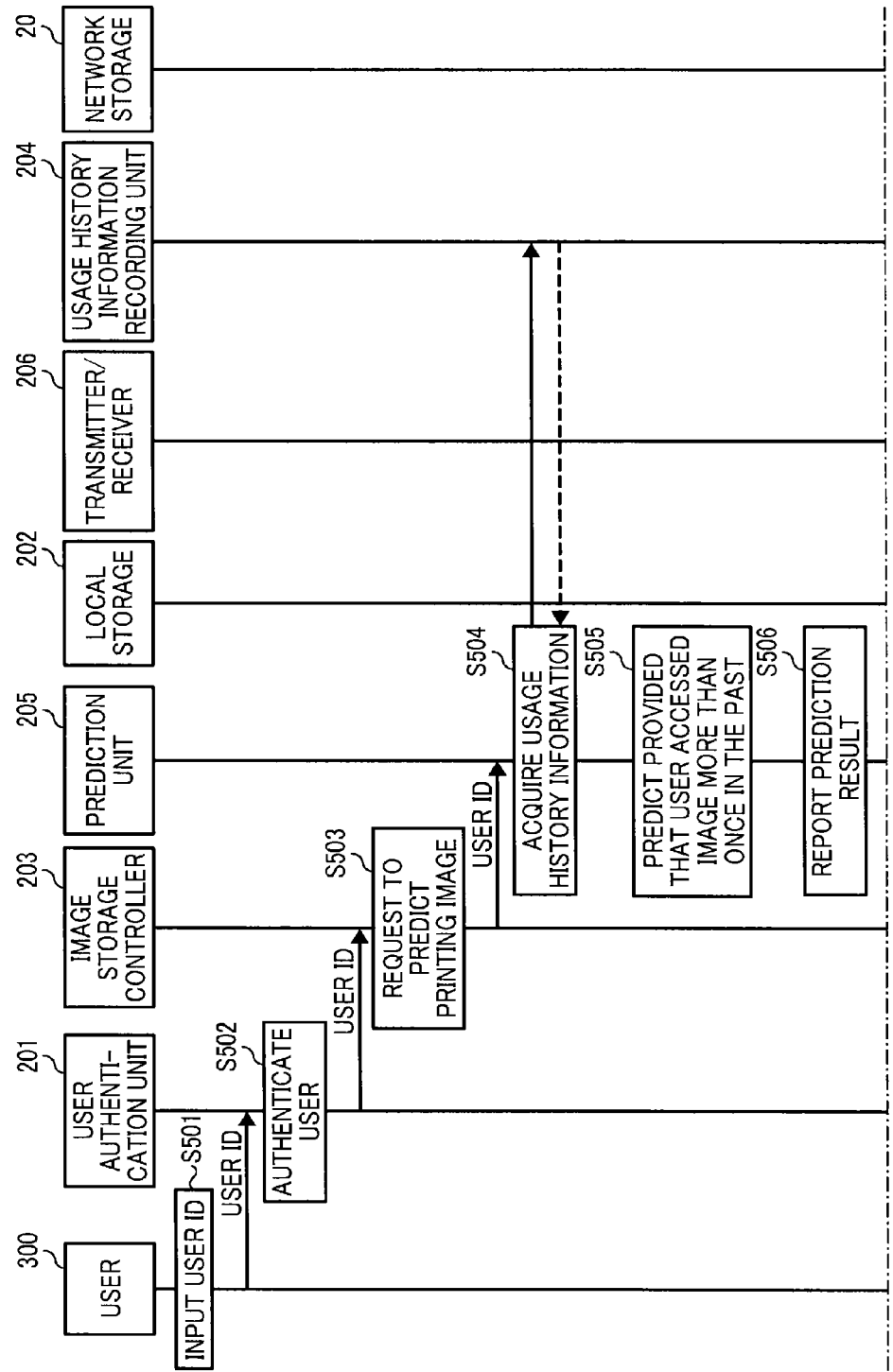

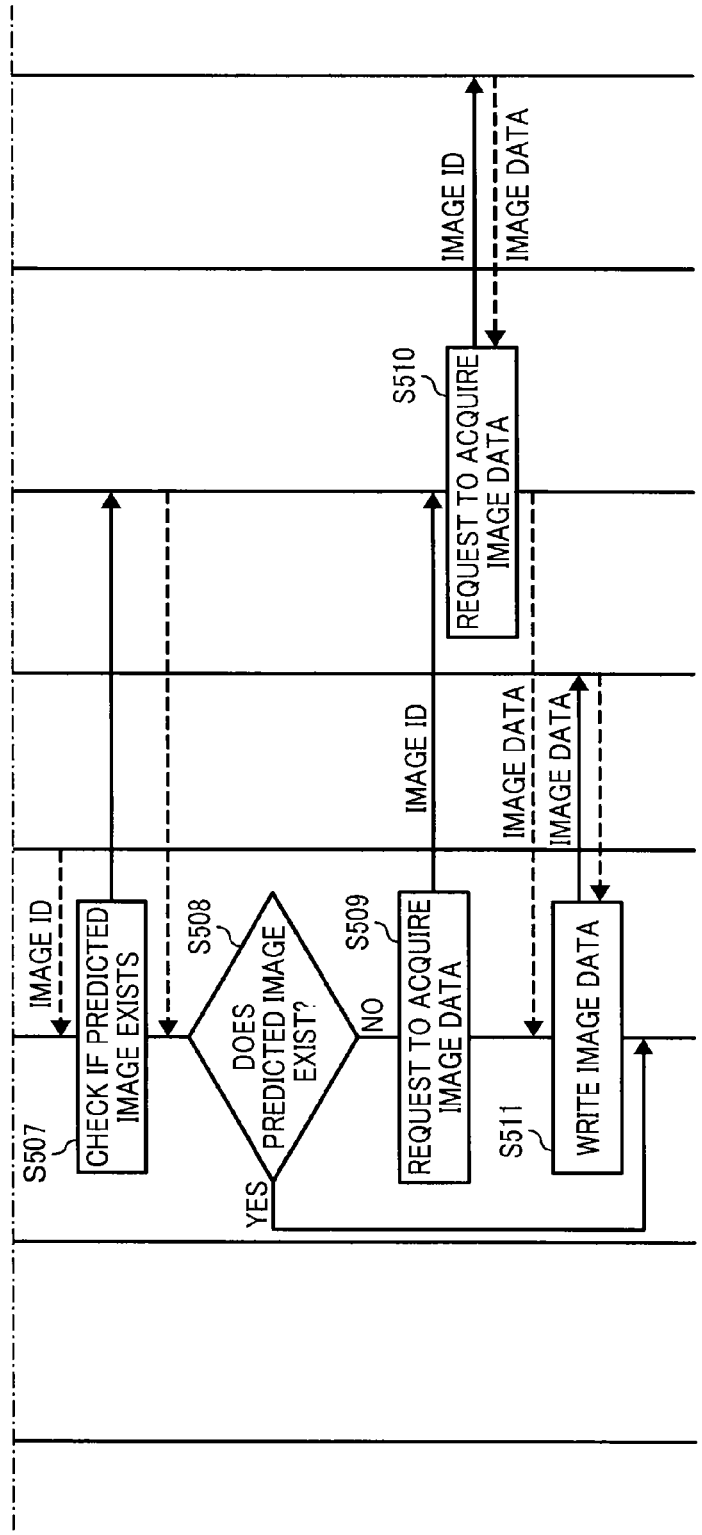

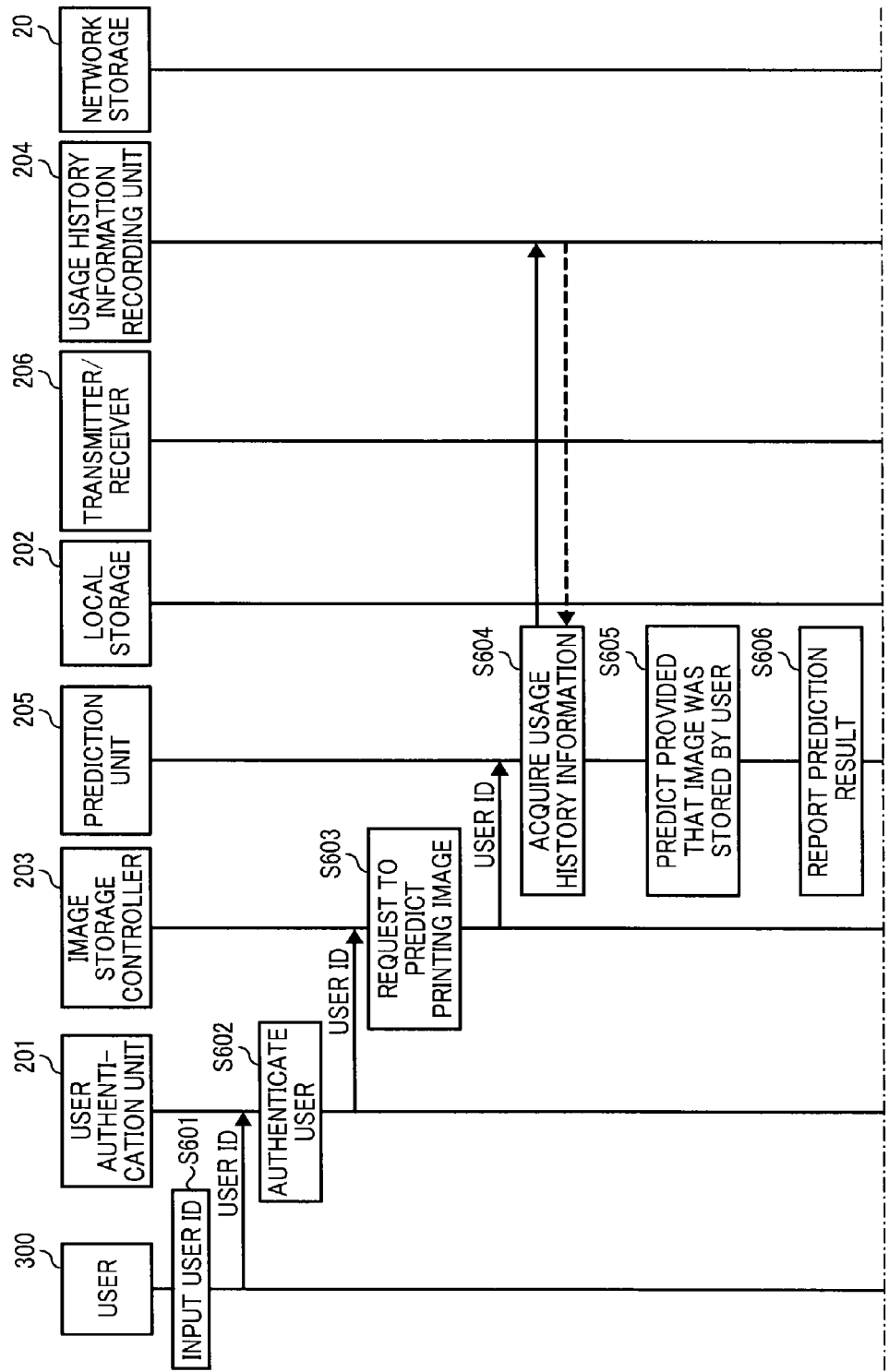

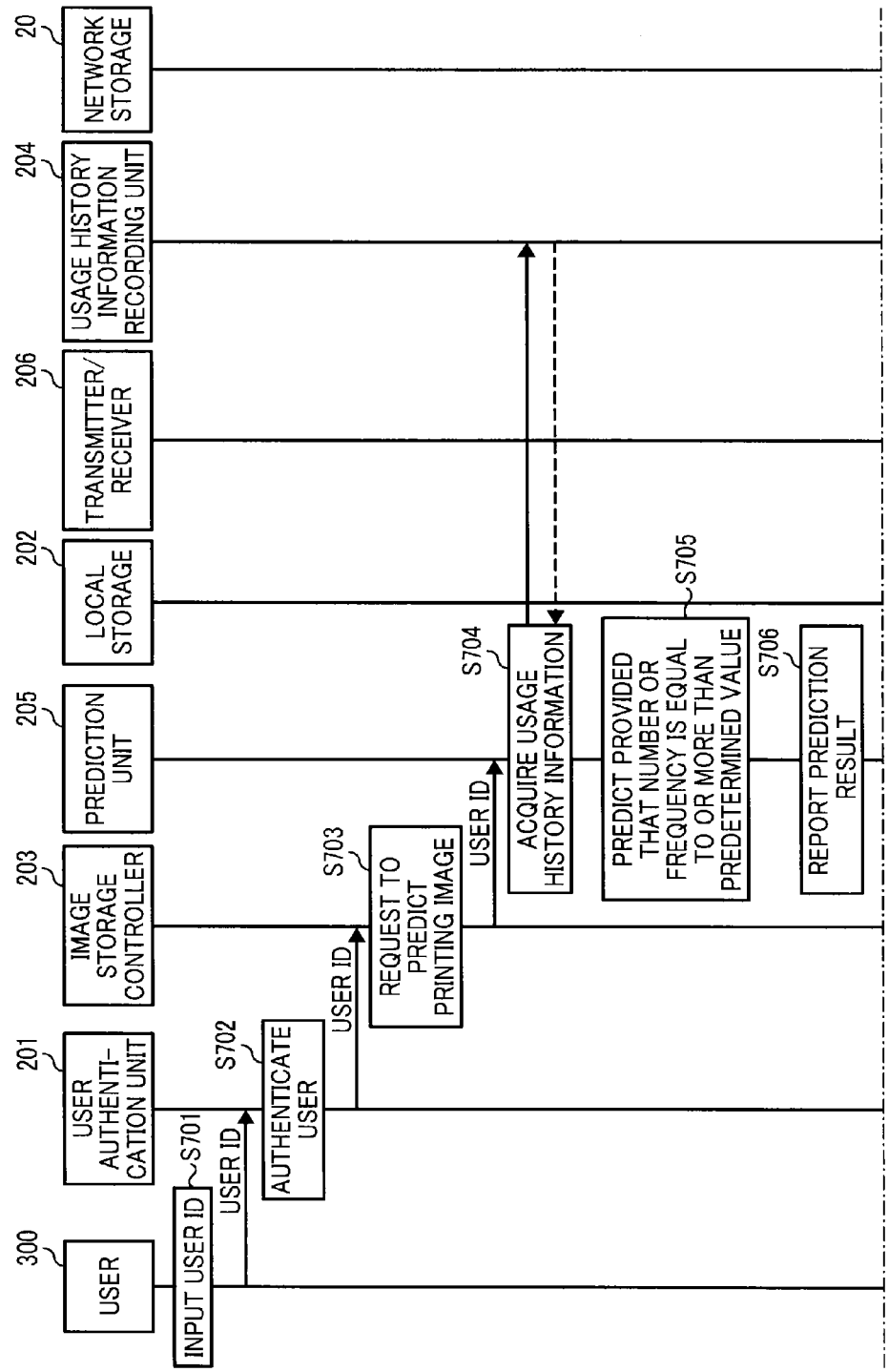

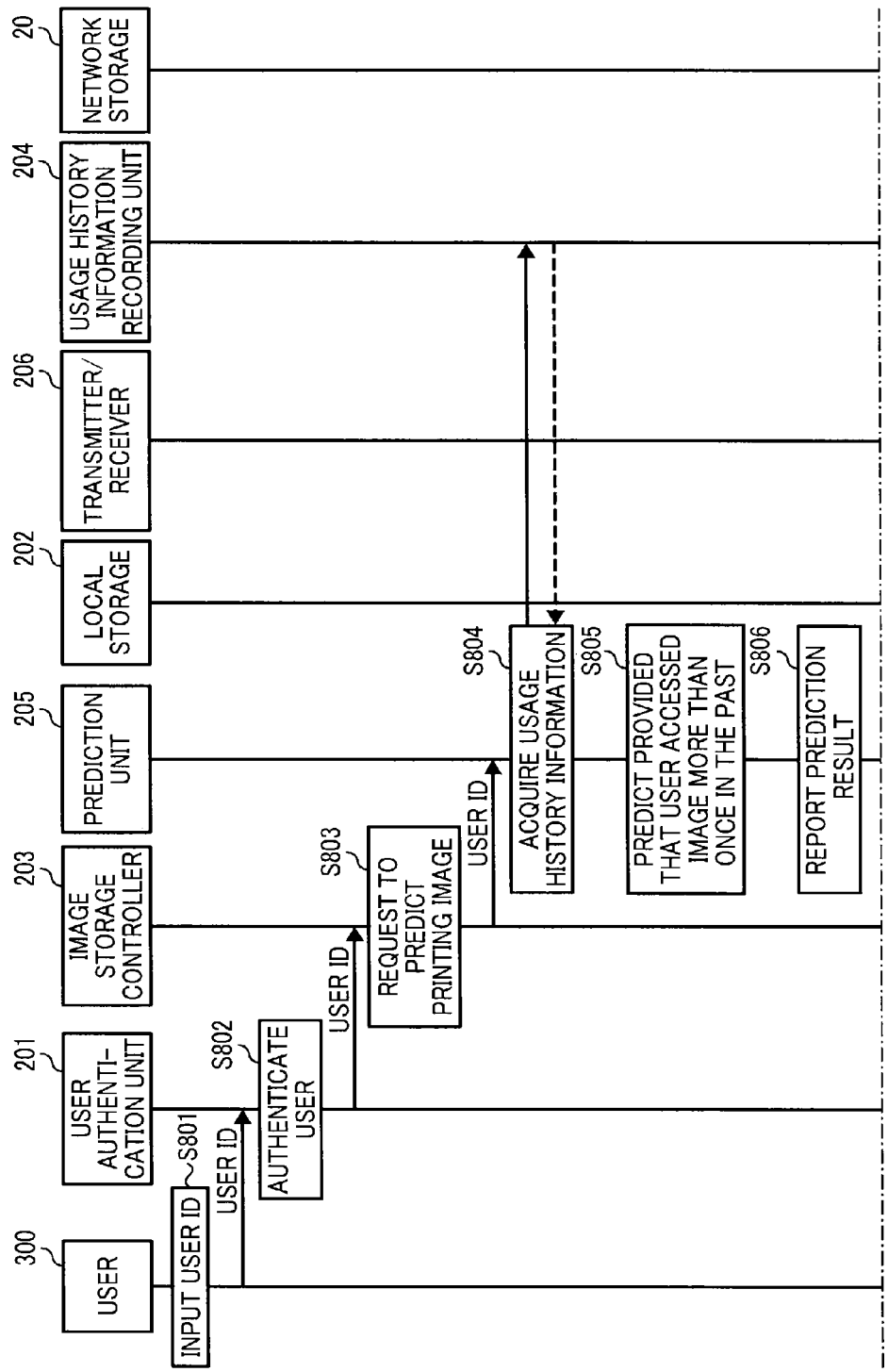

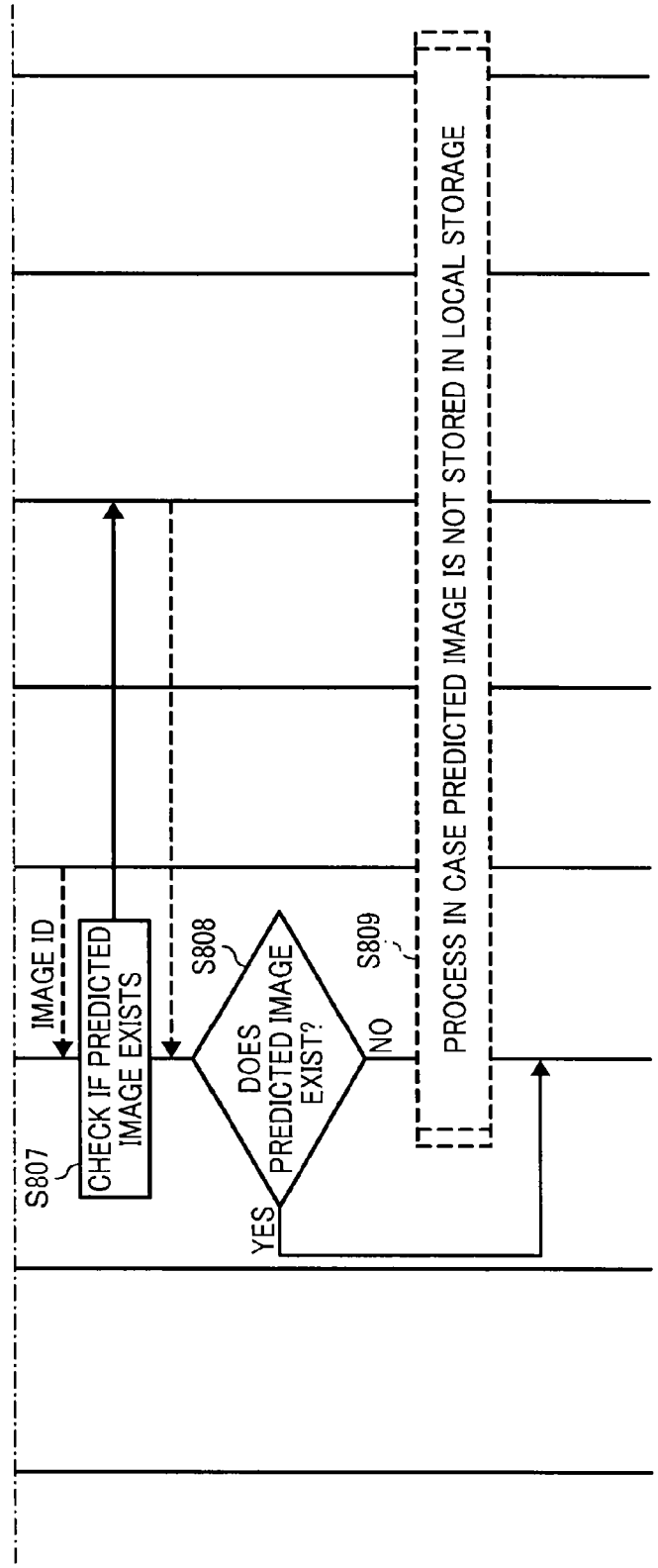

INFORMATION PROCESSING APPARATUS AND INFORMATION PROCESSING SYSTEM

CROSS-REFERENCE TO RELATED APPLICATION

This patent application is based on and claims priority pursuant to 35 U.S.C. §119(a) to Japanese Patent Application No. 2013-153152, filed on Jul. 24, 2013 in the Japan Patent Office, the entire disclosure of which is hereby incorporated by reference herein.

BACKGROUND

1. Technical Field

The present invention relates to an image processing apparatus and an image processing system.

2. Background Art

Conventionally, in information processing, not only dedicated local storage devices for information processing apparatuses (hereinafter referred to as "local storage") but also storage devices on networks and connected via the networks (hereinafter referred to as "network storage") are used for storing data.

For example, it is possible to store scanned data generated during copying and in receiving facsimile in the local storage to use for other purposes later. Thus, a multifunction peripheral (MFP) that implements a so-called document box function is known (e.g., JP-2006-261802-A).

A network storage function (document server function) technology that stores image data not in the local storage in the MFP but in a storage device on the network usable by multiple image forming apparatuses is also known (e.g., JP-2004-310357-A).

SUMMARY

Example embodiments of the present invention provide an improved information processing apparatus connected to a network storage via a network and an information processing system that includes the information processing apparatus and the network storage. The information processing apparatus includes a user authentication unit that authenticates a user, a data storage controller that controls the storing of data in a network storage and a local storage, a usage history information recording unit that records usage history information for all data stored in the network storage including user information who accessed the data, a prediction unit that predicts data that has a high probability of being accessed by a user based on identification information and the usage history information of a user authenticated by the user authentication unit, and an acquisition unit that acquires the data that has a high probability of being accessed predicted by the prediction unit from the network storage and stores the data in the local storage.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 4 is a table illustrating usage history information as an embodiment of the present invention.

FIGS. 5A and 5B are sequence charts illustrating a process executed by the image forming apparatus as an embodiment of the present invention.

FIGS. 6A and 6B are sequence charts illustrating a process executed by the image forming apparatus as another embodiment of the present invention.

FIGS. 7A and 7B are sequence charts illustrating a process executed by the image forming apparatus as yet another embodiment of the present invention.

FIGS. 8A and 8B are sequence charts illustrating a process executed by the image forming apparatus as modified embodiments of the present invention.

DETAILED DESCRIPTION

Figure 1:
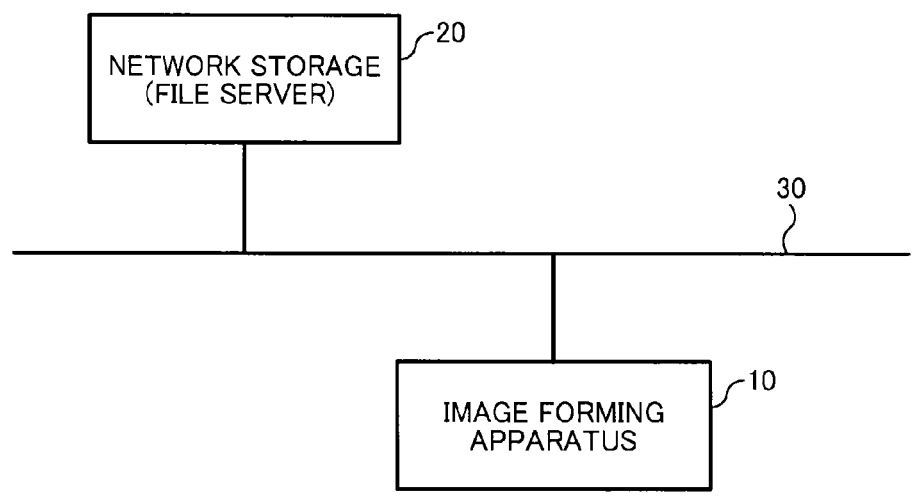
FIG. 1 is a diagram illustrating a configuration of an information processing system that includes an image forming apparatus as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the conventional technologies described above, in each case it is necessary to store the image data either in the document box (local storage) or in the network storage. In addition, in reusing the image data, it is necessary to check which storage device stores the desired data, the document box (local storage) or the network storage, which is inconvenient.

It is possible to solve the issue described above by integrating the local storage function and the network storage function and handling the network storage and the local storage as one storage area for example.

However, even if the function described above is implemented, it is necessary to download the image data stored in the network storage into the local storage in using the image data, and that results in taking some time until the image data is ready to use.

In case of reducing the size of the local storage due to cost cutting, etc., the ratio of the image data to be stored in the network storage increases, which aggravates the situation.

Similar issues can occur in using data other than the image data and on the information processing apparatuses other than the image forming apparatuses.

In the following embodiment, even if the size of the local storage is small, it is possible to store the data by using the network storage and the local storage together and thus use the data comfortably.

In the following embodiment, the image data is used as one example of the data, and the image forming apparatus is used as one example of the information processing apparatus.

FIG. 1 is a diagram illustrating a configuration of an information processing system that includes the image forming apparatus. As shown in FIG. 1, the information processing system includes the image forming apparatus 10 and the network storage 20 connected with each other via a network 30 communicably.

The image forming apparatus 10 is an apparatus such as a printer, facsimile, copier, and MFP used for an image forming process (hereinafter referred to as "printing"). In this case, the image forming apparatus 10 is the MFP that includes functions such as printing, scanning, copying, facsimile communication, network communication, and storing documents.

The network storage 20 stores the image data that the image forming apparatus 10 executes printing, and the network storage 20 is connected to the network 30. For example, a file server such as a Network Attached Storage (NAS) can be used as the network storage 20.

A computer that comprises a controller and a hard disk used for file service can be used as the network storage 20, and its OS is customized for file service or developed uniquely. However, its hardware configuration is basically the same as a general personal computer, so description for the hardware configuration is omitted.

Any storage device connected to the network 30 and accessible from the image forming apparatus 10 can be used as the network storage 20.

A Local Area Network (LAN) or a Wide Area Network (WAN) can be used as the network 30. The LAN or WAN can be either wired or wireless. It is possible that the network 30 is Internet and the network storage 20 is a data storage service apparatus set up in so-called cloud environment. Here, the network storage means the storage connected to the apparatus that uses the network storage via the network.

Figure 2:
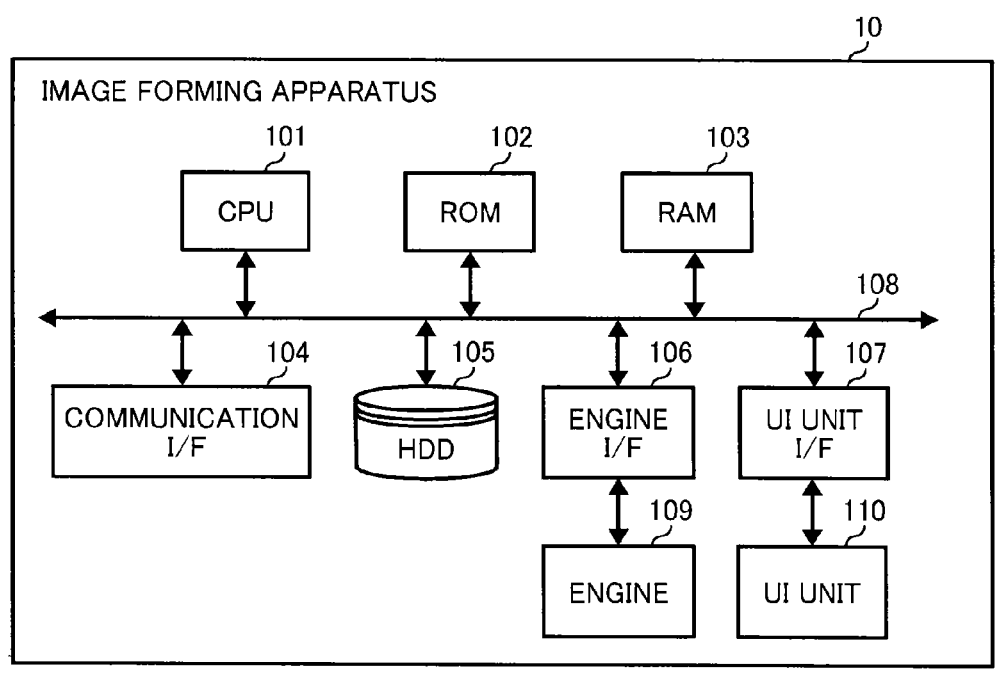
FIG. 2 is a block diagram illustrating a hardware configuration of the image forming apparatus as an embodiment of the present invention.

FIG. 2 is a block diagram illustrating a hardware configuration of the image forming apparatus. The hardware configuration of the image forming apparatus 10 can be similar to the known MFP appropriately.

For example, as shown in FIG. 2, the image forming apparatus 10 can include a CPU 101, a ROM 102, a RAM 103, a communication interface (I/F) 104, HDD 105, an engine I/F 106, and a user interface (UI) unit I/F connected with each other via a system bus 108. An engine unit 109 is connected to the engine I/F 106, and a UI unit 110 is connected to the UI unit I/F 107.

The CPU 101 controls the whole part of the image forming apparatus 10 by using the RAM 103 as a work area and executing programs stored in the ROM 102 or the HDD 105, and various functions such as printing can be implemented. The communication I/F 104 is used for communicating with the network storage 20 via the network 30 such as the LAN.

The engine unit 109 is an image forming engine etc. that performs outputting physically (e.g., printing) other than communication with outside or displaying. The engine I/F 106 connects the engine unit 109 with the CPU 101, and the CPU 101 can control the engine unit 109.

The U/I unit I/F 107 connects the UI unit 110 with the CPU 101, and the CPU 101 can control the UI unit 110.

The UI unit 110 includes a control panel that accepts user operation and a display panel that displays information. An external control panel and an external display unit can be used as the UI unit 110.

In this embodiment, the HDD 105 functions as the local storage. However, it is not limited to that example, and, for example, it is possible to use the HDD connected to the image forming apparatus 10 externally as the local storage. The local storage is the storage included in the apparatus that uses the storage or connected to the apparatus that uses the storage directly.

Next, the functional configuration of the image forming apparatus 10 is described below with reference to FIG. 3.

Figure 3:
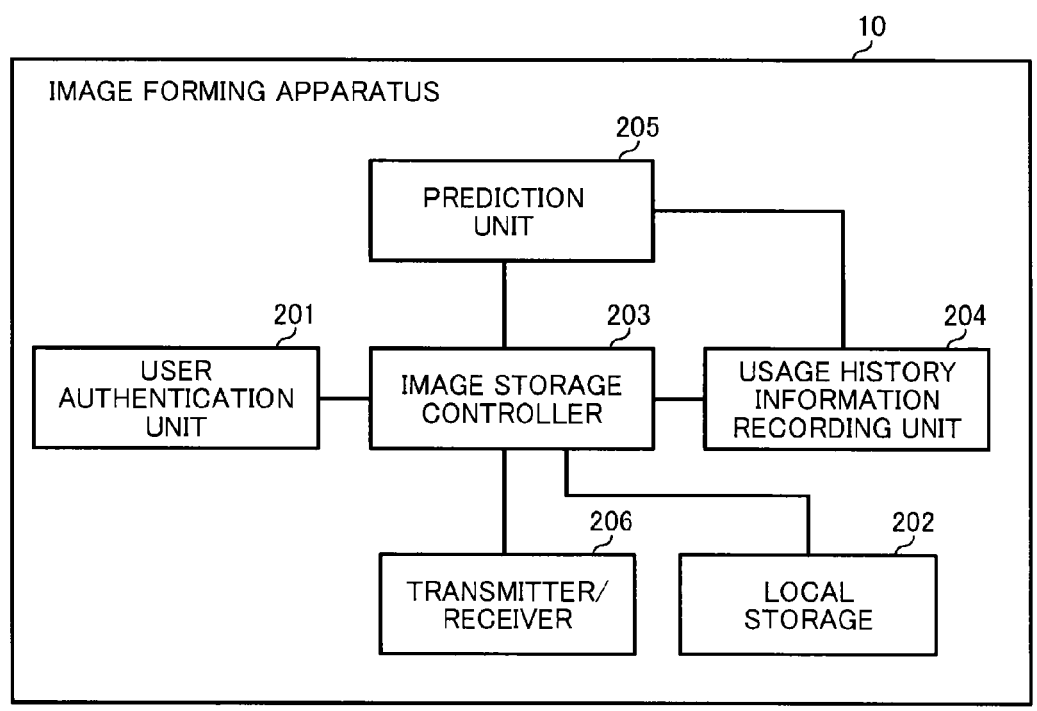
FIG. 3 is a block diagram illustrating a functional configuration of the image forming apparatus as an embodiment of the present invention.

FIG. 3 is a block diagram illustrating the functional configuration of the image forming apparatus 10 in this embodiment.

The image forming apparatus 10 includes a user authentication unit 201, the local storage 202, an image storage controller 203, a usage history information recording unit 204, a prediction unit 205, and a transmitter/receiver 206.

The user authentication unit 201 identifies and authenticates a user who utilizes the image data on the image forming apparatus 10. That function can be implemented by controlling the UI unit 110 described above by the CPU 101 running a predetermined program.

In this embodiment, the user authentication is performed by using an ID card that stores user identification data (ID). However, that is an example, and it is possible to authenticate using a password or perform facial recognition using a camera.

The local storage 202 functions as a storage device that stores the image data.

The image storage controller 203 functions as a data storage controller in the present invention. Based on the user operation, the image storage controller 203 stores the image data received from an input unit (not shown in figures) in the network storage 20 or the local storage 202. In addition, the image storage controller 203 stores predetermined image data downloaded from the network storage 20 in the local storage 202.

Regarding each image data stored in the local storage 202 or the network storage 20, the usage history information recording unit 204 stores usage history information including the identification data of the user who accessed the image data. Here, "access" indicates not only usage such as printing but also storing itself. If the same data is stored in both the local storage 202 and the network storage 20 due to a management issue on the image forming apparatus 10, it is unnecessary to create usage history information for all data individually. Considering that the two data are the same, it is possible to create a single usage history profile integrating the usage history of both data. Even in case of deleting the stored data from the local storage 202, the usage history information is not deleted if the data is still stored in the network storage 20.

In this embodiment, it is assumed that the usage history information for each image forming apparatus 10 is stored in the local storage 202 individually for example as a database. In case of merging and storing the usage history information of multiple image forming apparatuses 10 as a whole, it is possible to store it in the network storage 20.

The prediction unit 205 predicts image data that has a high probability of being accessed by user operation based on information of the user and the usage history information of the user who was authenticated by the user authentication unit 201.

Conditions to predict image data that has a high probability of being accessed by user operation have three patterns as described below for example.

First, the prediction unit 205 predicts that the image data accessed at least once before has a high probability of being accessed.

Second, the prediction unit 205 predicts that the image data stored by the user himself/herself has a high probability of being accessed.

Third, the prediction unit 205 predicts that the image data whose number of times accessed or frequency of being accessed is equal to or larger than a predetermined threshold value has a high probability of being accessed. Here, the number of times accessed means the total number of times accessed by the same user since the data was stored up to now. The frequency of being accessed can be determined by the number of times accessed during the most recent predetermined period of time for example.

The transmitter/receiver 206 transmits/receives the image data when the image storage controller 203 uploads the image data to the network storage 20 or downloads the image data from the network storage 20.

The image storage controller 203 functions as an acquisition unit that acquires the image data predicted that it has a high probability of being accessed by the prediction unit 205 from the network storage 20 and stores the image data in the local storage 202.

FIG. 4 is a table illustrating usage history information. As shown in FIG. 4, the usage history information includes an image ID that specifies the stored data (the image data in this case), a storage user ID as identification information of the user who stored the image data, and a print history of the image data (an example of the usage history) etc. The print history includes a printer user ID as identification information of the user who performed printing and the number of printing. Furthermore, the number of printing is separated into the total number of printing up to now since the image data was stored and the number of printing during the most recent predetermined period of time. The number of printing during the most recent predetermined period of time is referred to as "frequency" hereinafter.

In the example shown in FIG. 4, the table is configured using the image data as criteria. However, it is possible to adopt the data configuration using the user as criteria. For example, it is possible to register a user ID associated with the image ID of the image data stored by the user and the image ID of the image data printed by the user before (along with the number of printing of the image data and the time of printing).

First Embodiment

FIGS. 5A and 5B are sequence charts illustrating a process that predicts the image data that has a high probability of being accessed by the user, acquires the image data from the network storage 20, and stores the image data in the local storage 202 executed by the image forming apparatus 10 in an embodiment.

The process is performed by implementing functions of each functional block included in the image forming apparatus 10 by the CPU 101 running a predetermined control program. However, it is described below that functional blocks perform the process for convenience of the description.

The process starts when the user 300 accesses the image forming apparatus 10 trying to use the image forming apparatus 10.

First, the user 300 inputs the user ID by scanning the ID card that stores the identification information using a card reader connected to the image forming apparatus 10 (not shown in figures) and request the user authentication unit 201 to authenticate the user in S501. In this case, the user ID is input by using the ID card. However, it is also possible to input the user ID directly using a keyboard on a control panel (not shown in figures).

Next, the user ID is transferred to the user authentication unit 201, and the user authentication unit 201 performs the user authentication in S502.

After succeeding in the user authentication, the user authentication unit 201 transfers the user ID to the image storage controller 203. After receiving the user ID, the image storage controller 203 instructs the prediction unit 205 to predict image data that has a high probability of being printed in S503.

After receiving the user ID and being instructed to predict the image data, the prediction unit 205 acquires usage history information from the usage history information recording unit 204 in S504.

As described above, the usage history information includes access history in the past.

Next, the prediction unit 205 searches through the usage history information and predicts under the condition being accessed even once in the past in S505.

That is, in the usage history information, the prediction unit predicts that the image data whose storage user ID corresponds to the user ID of the user 300 or the image data whose printer user ID in the printing history corresponds to the user ID has a high probability of being printed by the user 300.

As a result, assuming the usage history information is the same as shown in FIG. 4, in the case of the user 300 whose user ID is "001", at least the image data whose image ID is "000101" and "000102" have a high probability of being printed. The prediction unit 205 reports the image ID of the image data predicted to have a high probability of being printed (hereinafter referred to as "predicted image") to the image storage controller 203 in S506.

The image storage controller 203 searches through the local storage 202 and checks whether or not the image data corresponding to the received image ID is stored in the local storage 202 in S507.

If the predicted image data is not stored (No in S508), the image storage controller 203 passes the image ID of the image data to the transmitter/receiver 206 and instructs the transmitter/receiver 206 to acquire the image data from the network storage 20 in S509.

After being instructed by the image storage controller 203, the transmitter/receiver 206 passes the image ID to the network storage 20 and instructs the network storage 20 to transfer the image data in S510.

After acquiring the image data from the network storage 20, the transmitter/receiver 206 passes the image data to the image storage controller 203.

Next, the image storage controller 203 stores the received image data in the local storage 202 in S511.

By contrast, if the predicted image data is stored in the local storage 202 (YES in S508), the process ends.

It is preferable that the process described above is started and executed automatically when the user 300 instructs the user authentication. However, since copying is just performed without using the local storage 202 in some cases, it is possible to start the process when the local storage 202 is accessed (instruction to use in case of using the local storage 202).

It is possible to omit the steps in S507 and S508 that check whether or not the predicted image data is stored in the local storage 202. If the predicted image is already stored in the local storage 202, it is possible not to eat up the size of the local storage 202 by overwriting the predicted image.

Second Embodiment

Figure 6B:
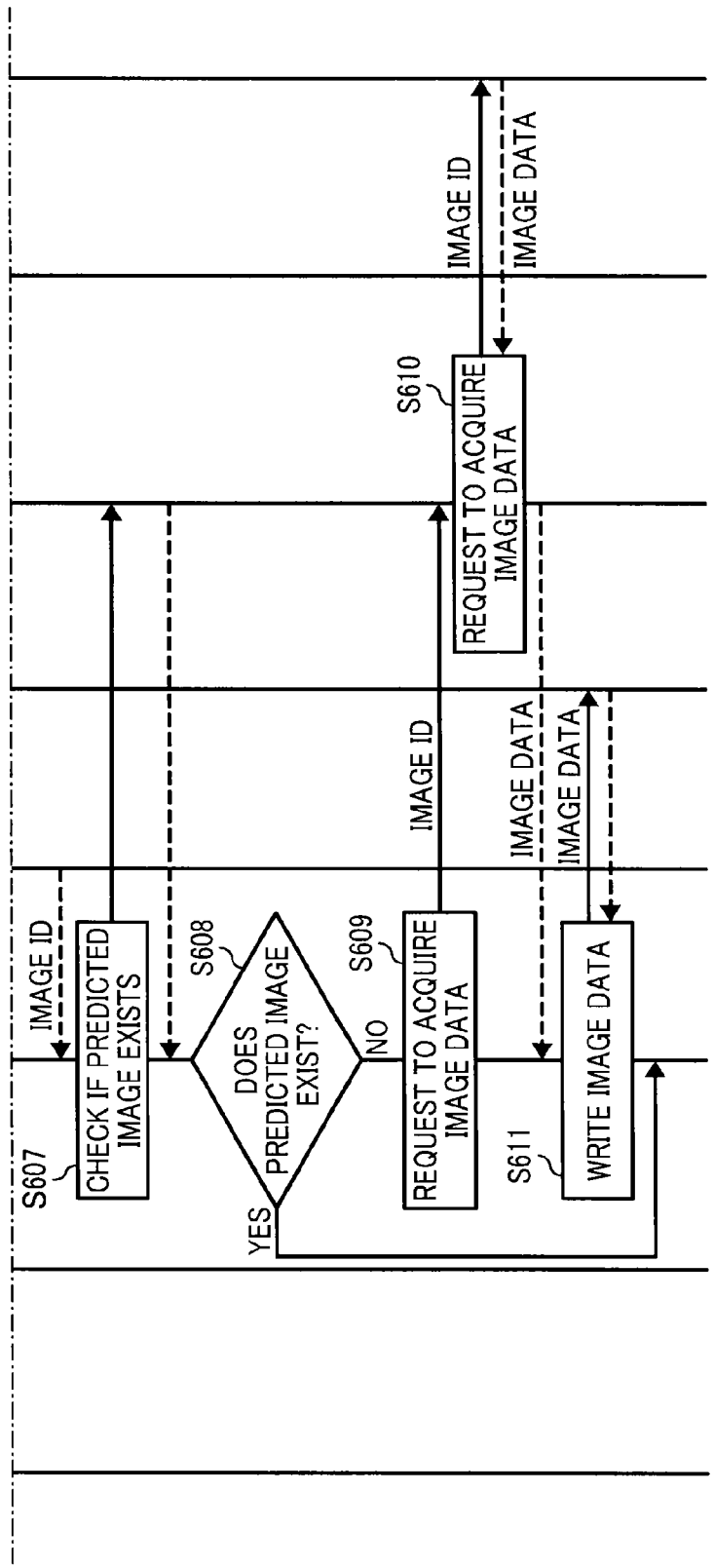

FIGS. 6A and 6B are sequence charts illustrating a process that predicts the image data that has a high probability of being accessed by the user, acquires the image data from the network storage 20, and stores the image data in the local storage 202 executed by the image forming apparatus 10 in another embodiment.

The only point different from the first embodiment shown in FIG. 5 is the prediction condition in the prediction unit 205.

In this embodiment, the prediction unit 205 predicts that the image data that the user 300 stored himself/herself has a high probability of being printed in S605.

That is, in the usage history information, the prediction unit predicts that only the image data whose storage user ID corresponds to the user ID of the user 300 has a high probability of being printed by the user 300.

Since all steps except the step described above are the same as the first embodiment, descriptions for those steps are omitted.

The step that the user 300 stores the image data is not shown in figures since that is not immediately related to the present invention. However, it is possible to implement that step as shown below for example.

First, the user 300 inputs an image by using an input unit such as a scanner included in the image forming apparatus 10 (not shown in figures). After inputting the image, the image data is transferred from the input unit to the image storage controller 203. After receiving the image data, the image storage controller 203 stores the image data in the local storage 202.

Next, the image storage controller 203 instructs the transmitter/receiver 206 to store the image data in the network storage 20. After receiving the instruction, the transmitter/receiver 206 reads the stored image data from the local storage 202 and transfers the image data to the network storage 20.

After that, the image storage controller 203 writes the user ID of the user 300 who instructs to store the image and the image ID of the store image in the usage history information recording unit 204.

As described above, the usage history information shown in FIG. 4 is stored in the usage history information recording unit 204.

Third Embodiment

Figure 7B:
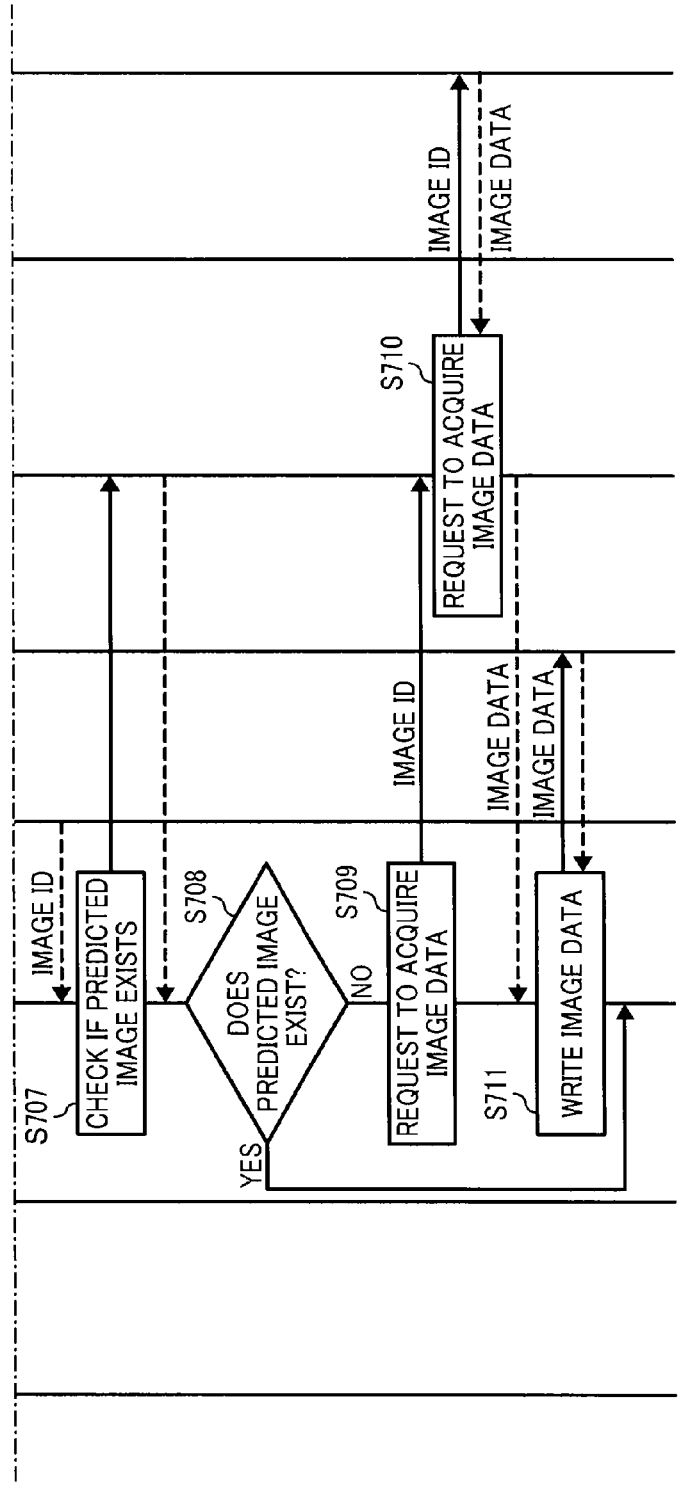

FIGS. 7A and 7B are sequence charts illustrating a process that predicts the image data that has a high probability of being accessed by the user, acquires the image data from the network storage 20, and stores the image data in the local storage 202 executed by the image forming apparatus 10 in yet another embodiment.

The only point different from the first embodiment shown in FIG. 5 is the prediction condition in the prediction unit 205.

That is, in this embodiment, it is predicted that the image data whose number of times or frequency used by the user 300 is equal to or larger than a predetermined value has a high probability of being printed by the user 300 in S705.

In other words, it is predicted that the image data whose number of times of being printed or frequency in the past is equal to or larger than the predetermined value has a high probability of being printed by the user 300 among the image data whose printer user ID corresponds to the user 300's user ID.

Here, "the number of times" can be expressed by the total number of times being printed up to now, and "the frequency" can be expressed by the number of times being printed during the most recent predetermined period of time. The fact that the number of times is large during the predetermined period of time indicates that the frequency is high.

For example, assuming that "the predetermined value" is five in total and three during the most recent period of time, in the case of the user 300 whose user ID is "004", the image data whose image ID is "000101" corresponds to the predicted image.

Since all steps except the step described above are the same as the first embodiment, descriptions for those steps are omitted.

Fourth Embodiment

FIGS. 8A and 8B are sequence charts illustrating a process that predicts the image data that has a high probability of being accessed by the user, acquires the image data from the network storage 20, and stores the image data in the local storage 202 executed by the image forming apparatus 10 in an embodiment that modifies the first, the second, and the third embodiment.

The point different from the first embodiment shown in FIGS. 5A and 5B, the second embodiment shown in FIGS. 6A and 6B, and the third embodiment shown in FIGS. 7A and 7B is the step that acquires the image data from the network storage 20 in S809 if the image data predicted according to the predetermined criteria is not stored in the local storage 202 (NO in S808).

That is, the step that queries the network storage 20 about the data size of the predicted image and deletes unnecessary image data from the local storage 202 if the image data size exceeds the available space in the local storage 202 is added.

Since steps from S801 to S808 are the same as the steps from S501 to S508 shown in FIGS. 5A and 5B, descriptions for those steps are omitted.

Figure 9A:
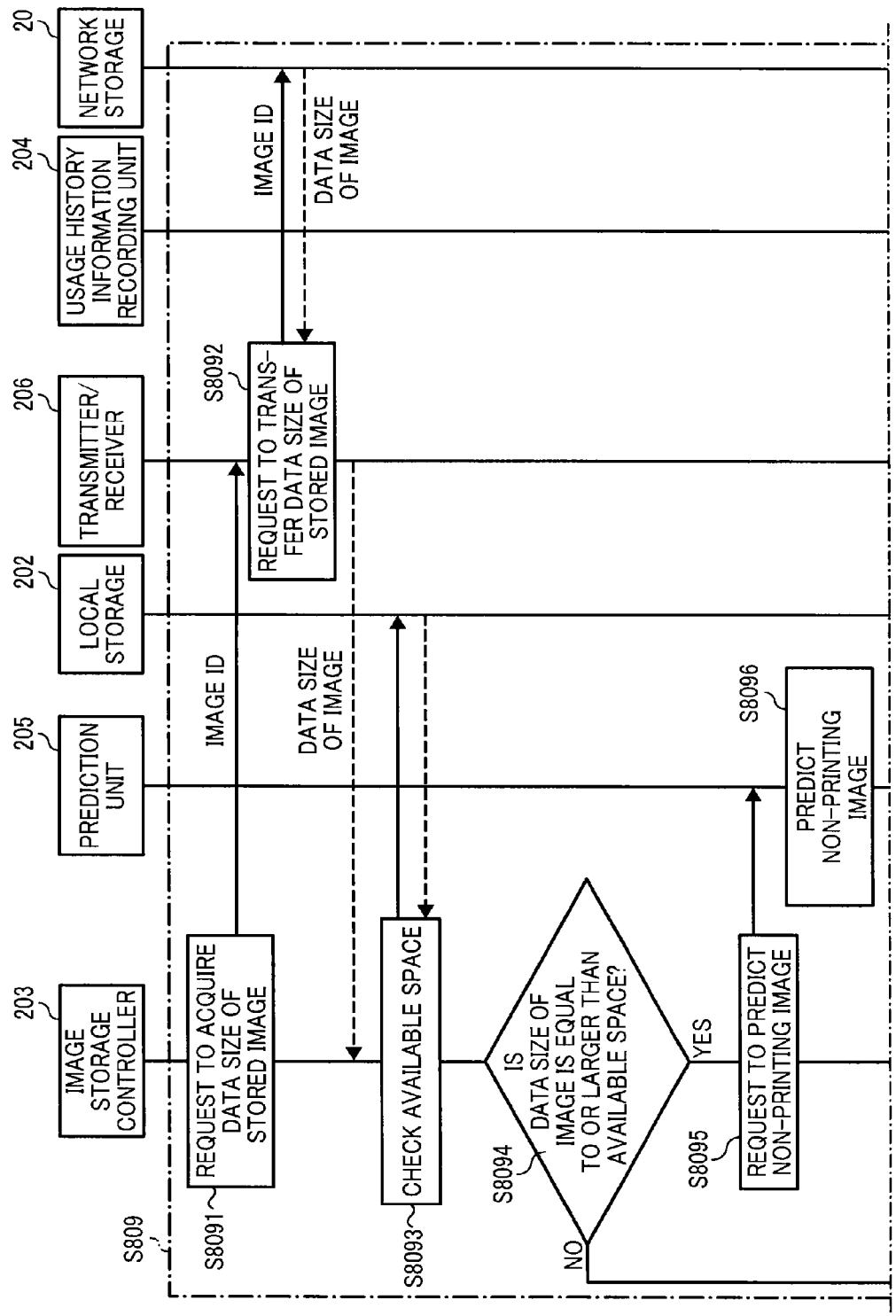
FIGS. 9A and 9B are sequence charts illustrating a process in S809 shown in FIG. 8 as an embodiment of the present invention.
Figure 9B:
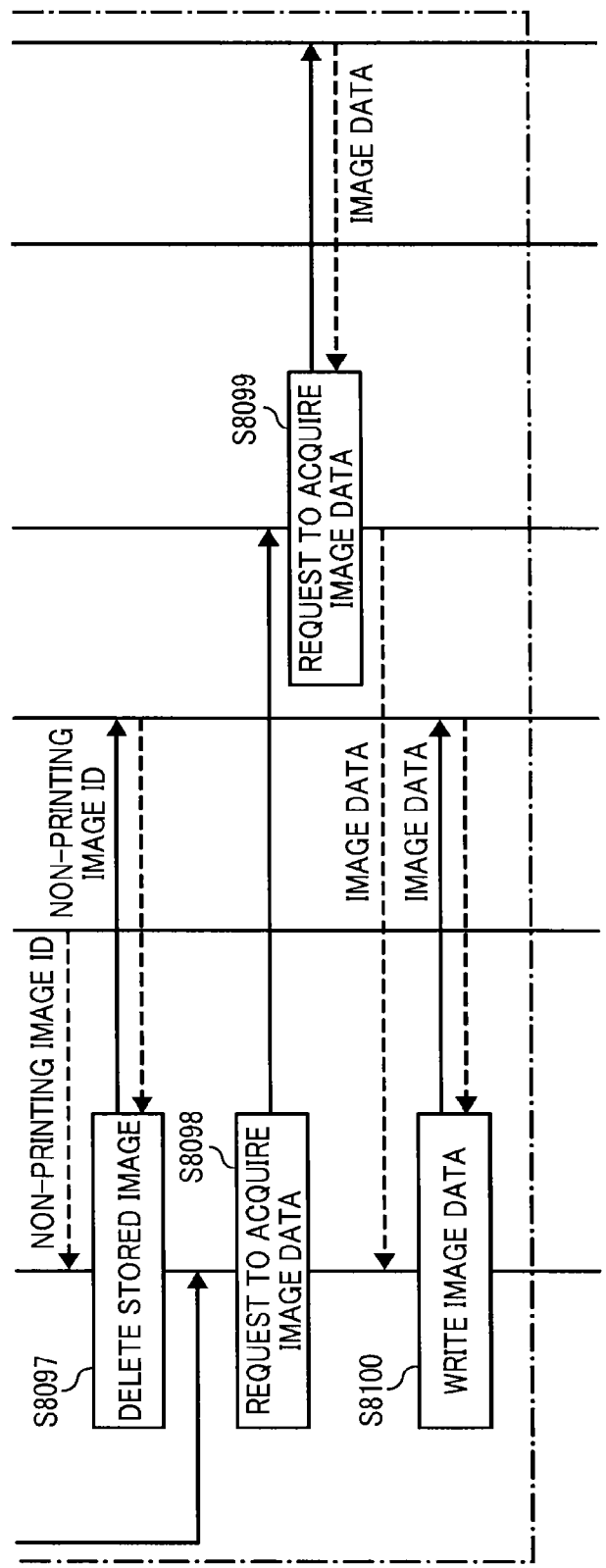

The process in S809 shown in FIG. 8B is described below with reference to FIGS. 9A and 9B. FIGS. 9A and 9B are sequence charts illustrating the process in S809 shown in FIG. 8.

First, after transferring the image ID of the predicted image to the transmitter/receiver 206, the image storage controller 203 instructs the transmitter/receiver 206 to acquire the size of the image data to be downloaded from the network storage 20 in S8091.

The transmitter/receiver 206 transfers the image ID to the network storage 20 and instructs to transfer the image data size in S8092.

The image storage controller 203 checks the available space of the local storage 202 and compares the available space with the image data size acquired via the transmitter/receiver 206 in S8093.

If the size of the image data to be downloaded is equal to or larger than the available space in the local storage 202 (YES in S8094), the image storage controller 203 instructs the prediction unit 205 to predict an image presumed most likely not to be printed in S8095. That is, the purpose for that instruction is to ensure the available space for storing the predicted image data by predicting the image presumed most likely not to be printed by the user 300 (hereinafter referred to as "the images not to be printed") and deleting it.

Examples of the prediction condition for the images not to be printed are that the image data whose number of times and frequency used by the user 300 is less than the predetermined value is considered as the image not to be printed after referring to the usage history information, and all images except the predicted image data are considered as the images not to be printed The prediction unit 205 predicts the images not to be printed under the conditions described above in S8096 and reports the image ID (the image ID not to be printed) to the image storage controller 203.

After receiving the image ID not to be printed, image storage controller 203 searches through the local storage 202 and deletes the image data that has the image ID not to be printed in S8097.

Next, the image storage controller 203 transfers the image ID of the predicted image data reported in S806 to the transmitter/receiver 206 and instructs the transmitter/receiver 206 to acquire image data from the network storage 20 in S8098.

After receiving the instruction from the image storage controller 203, the transmitter/receiver 206 passes the image ID to the network storage 20 and instructs to acquire the image data in S8099.

Next, after acquiring the image data from the network storage 20, the transmitter/receiver 206 passes the image data to the image storage controller 203.

After receiving the image data, the image storage controller 203 stores the received image data in the local storage 202 in S8100.

By contrast, if the size of the predicted image data is less than the available space in the local storage 202 (NO in S8094), the image storage controller 203 instructs to acquire the image data immediately in S8098. Since the local storage 202 has plenty of available space, it is unnecessary to delete the image data not to be printed.

In the embodiment described above, in storing the image data, the image data is stored in both the local storage 202 and the network storage 20. However, it is possible to store the image data only in the network storage 20. Otherwise, after storing the image data in the local storage 202 once, it is possible to move or copy the image data to the network storage 20 appropriately.

In the image forming apparatus described above, the image that has a high probability to be printed by user operation is predicted based on the user ID, the image is acquired from the network storage connected via the network, and the image is stored in the local storage. Consequently, it is possible to minimize the waiting time until the printing starts, and that can enhance user-comfort. That is, the image data that has a high probability to be printed by user operation is downloaded to the local storage at the timing of user authentication etc. before instructing to print. Therefore, it is possible to start printing the image quickly as if the image data has been stored in the local storage from the beginning.

The user authentication is preferable for the timing to start downloading the data from the network storage since it is considered that the user shows the intention to use the apparatus by the user authentication. However, it is possible to start downloading the data on other occasions.

Since it is unnecessary to store the image that has a high probability to be printed by user operation in the local storage preliminarily, it is not necessary to implement the large local storage. Ultimately, it is possible to use only network storage for all long-term storage. In this case, since the image data can be stored in the network storage only, it is unnecessary that the local storage comprises the nonvolatile memory, and the volatile memory (RAM) can be used for that purpose.

By configuring so that the image data not to be printed in the local storage is deleted if the data size of the predicted image exceeds the available space in the local storage as described in the fourth embodiment above, it is possible to download the necessary image data to the local storage assuredly even if the size of the local storage is small.

In addition, it is possible to search through the local storage 202 in acquiring the data from the network storage 20 and not to acquire data already store in the local storage 20 from the network storage 20. Consequently, it is possible to cut time required to download and prevent from not finishing downloading by the timing when the image data is used.

In the embodiments described above, it is considered that the data is the image data and it is used for "printing". However, that is not limited to that example, and data can be music data, video data, or document data. Furthermore, the data can even be machining data etc. Basically, the present invention can be applied to electronic data that can be reused in the future. The data can be used arbitrarily in accordance with the characteristic of the data.

The present invention can be applied to any information processing apparatus that handles those data.

The present invention also encompasses an information processing method performed by an information processing apparatus. The method includes the steps of authenticating a user, controlling storing data in a network storage and a local storage, recording usage history information for all data stored in the network storage including user information who accessed the data, predicting data that has a high probability of being accessed by the user based on identification information and the usage history information of the user who is authenticated in the user authentication step, and acquiring the data that has a high probability of being accessed predicted in the prediction step from the network storage and stores the data in the local storage.

The present invention also encompasses a non-transitory recording medium storing a program that executes the information processing method, performed by the information processing apparatus.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. An information processing apparatus, comprising:
circuitry configured to
 authenticate a user as an authenticated user,
 control storing image data in at least one of a network storage and a local storage,
 record, for each image data stored in the network storage, usage history information including user information regarding one or more users who have accessed the image data, and number of times accessed or frequency of being accessed by each user of the one or more users,
 predict image data that has a high probability of being accessed by the authenticated user based on identification information identifying the authenticated user and the usage history information, the circuitry being configured to predict the image data that has a high probability of being accessed based on whether the identification information identifying the authenticated user and identification information identifying a user who stores each image data match, and to predict the image data that has a high probability of being accessed based on whether number of times accessed or frequency of being accessed by the authenticated user is larger than a predetermined value, query the network storage about size of the image data that has a high probability of being accessed as predicted, and acquire the image data that has the high probability of being accessed as predicted from the network storage and store the image data in the local storage after deleting image data that meets certain predetermined criteria from the local storage when the image data size is larger than available space in the local storage.

2. The information processing apparatus according to claim 1, wherein the predetermined criteria is that a number of times that the authenticated user accesses the image data or a frequency with which the authenticated user accesses the image data is less than a predetermined value.

3. The information processing apparatus according to claim 1, wherein the circuitry does not acquire image data already stored in the local storage from the network storage.

4. The information processing apparatus according to claim 1, wherein the circuitry is configured to predict and acquire upon user authentication.

5. An information processing system, comprising:
the information processing apparatus of claim 1; and
the network storage connected to the information processing apparatus through a network.

6. A method, comprising:
authenticating a user as an authenticated user;
controlling storing image data in at least one of a network storage and a local storage;
recording, for each image data stored in the network storage, usage history information including user information regarding one or more users who have accessed the image data, and number of times accessed or frequency of being accessed by each user of the one or more users;
predicting, using circuitry, image data that has a high probability of being accessed by the authenticated user based on identification information identifying the authenticated user and the usage history information, the predicting predicts the image data that has a high probability of being accessed based on whether the identification information identifying the authenticated user and identification information identifying a user who stores each image data match, and the predicting predicts the image data that has a high probability of being accessed based on whether number of times accessed or frequency of being accessed by the authenticated user is larger than a predetermined value;

querying the network storage about size of the image data that has a high probability of being accessed as predicted; and acquiring the image data that has the high probability of being accessed as predicted from the network storage and storing the image data in the local storage after deleting image data that meets certain predetermined criteria from the local storage when the image data size is larger than available space in the local storage.

7. A method, comprising:
authenticating a user as an authenticated user;
controlling storing image data in at least one of a network storage and a local storage;
recording, for each image data stored in the network storage, usage history information including user information regarding one or more users who have accessed the image data, and number of times accessed or frequency of being accessed by each user of the one or more users;
predicting, using circuitry, image data that has a high probability of being accessed by the authenticated user based on identification information identifying the authenticated user and the usage history information, the predicting predicts the image data that has a high probability of being accessed based on whether the identification information identifying the authenticated user and identification information identifying a user who stores each image data match;

querying the network storage about size of the image data that has a high probability of being accessed as predicted; and acquiring the image data that has the high probability of being accessed as predicted from the network storage and storing the image data in the local storage after deleting image data that meets certain predetermined criteria from the local storage when the image data size is larger than available space in the local storage, the predetermined criteria corresponding to a number of times that the authenticated user accesses the image data or a frequency with which the authenticated user accesses the image data being less than a predetermined value.

* * * * *